Aug. 19, 1941.	E. F. OHLENDORF	2,253,391
DISK IMPLEMENT
Filed April 1, 1939	2 Sheets-Sheet 1

INVENTOR:
EMIL F. OHLENDORF
ATTORNEYS.

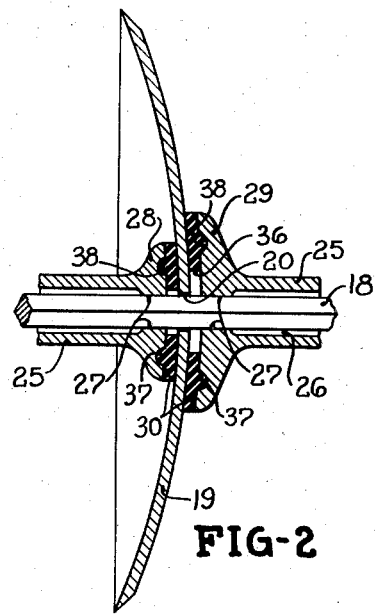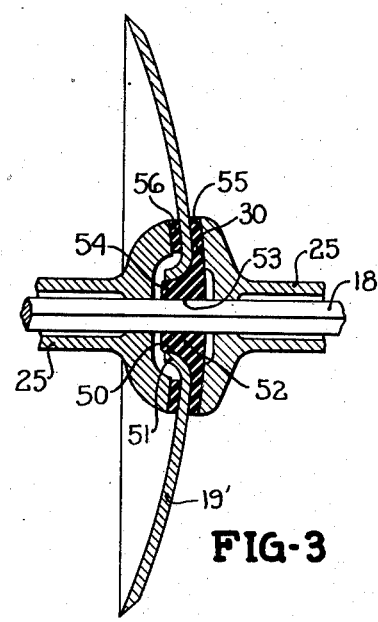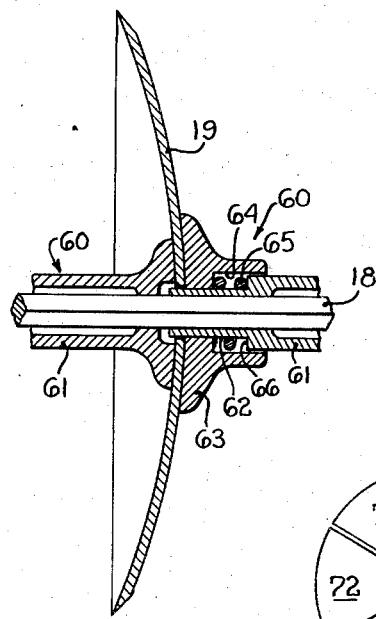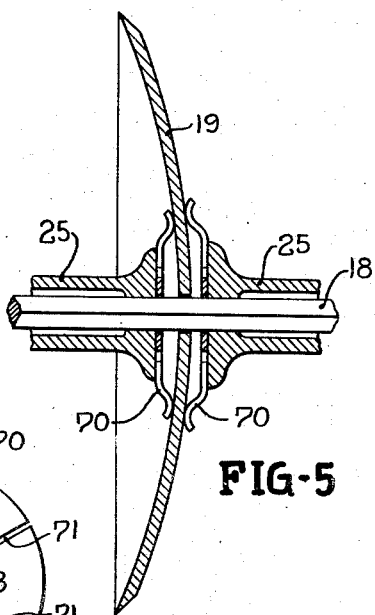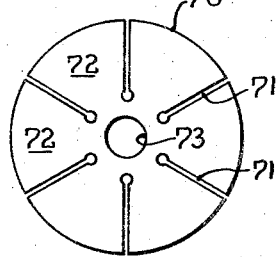

Patented Aug. 19, 1941

2,253,391

UNITED STATES PATENT OFFICE 2,253,391

DISK IMPLEMENT

Emil F. Ohlendorf, Moline, Ill., assignor to Deere & Company, Moline, Ill., a corporation of Illinois Application April 1, 1939, Serial No. 265,505

8 Claims. (Cl. 97—220)

The present invention relates generally to ground working disk implements and has for its general object the provision of a novel means for mounting the disks whereby the breakage of discs and the supports therefor due to striking stones and rocks or any vibrations set up in the implement when it is drawn through the soil is appreciably reduced, if not entirely eliminated.

Implement manufacturers have been attempting for many years to solve the problem of excessive wear and breakage of disks, which are necessarily of relatively thin metal and sharp edged. Development heretofore has been along the lines of improving the material from which the disks are made, and at the present time, disks are generally made of special high grade alloy steel. Although such disks have a much longer life than disks of ordinary steel, they are necessarily more expensive.

I have found that when a very small amount of resiliency is introduced between the disk and its supporting standard, the wear on the sharp cutting edge is greatly reduced and breakage of the disk and the supports therefor is practically eliminated. The amount of resiliency required for protection is practically imperceptible, as the disk appears to be rigidly mounted on its support. In fact, an excess of flexibility in the mounting would be undesirable because the disk would not then be held in position to cut properly, yet there must be sufficient flexibility or yielding so as to permit each disk, which is supported centrally on the gang bolt, either directly or by cushioning means, to have a limited amount of lateral movement, at least at the central section, so as to reduce, absorb, or cushion lateral shocks, vibrations, and the like. A specific object of my invention, therefore, relates to the provision of a disk mounting which provides a small amount of resiliency between each disk and its supporting shaft.

In tests that were conducted with disks yieldingly mounted in accordance with my invention, the latter demonstrated their ability to withstand, without appreciable effect, shocks that broke or bent rigidly mounted tools and otherwise rendered the same unfit for further use.

In stony fields in which frequent replacements of rigidly mounted blades are necessary, other blades, which were mounted in accordance with the principles of my invention, showed very little evidence of deterioration and no failures requiring replacement of the tool were observed. The additional cost of resiliently mounting disks according to this invention, over the cost of mounting them rigidly, is very small, and is in fact negligible in view of the savings obtained. A further saving can be enjoyed by using disks of ordinary steel instead of the special alloy steel, because I have found that ordinary steel disks have satisfactory durability when resiliently mounted, and under some working conditions the use of alloy steel is not justifiable.

Many other savings and advantages are obtained by the use of the present invention. Not only is breakage of disks eliminated, but also breakage of gang bolts, bearing castings, spacing spools, and gang frames.

In the accomplishment of these objects, washers of rubber or other resilient material are inserted between the disks and the spacing spools. This eliminates one machine operation, for it is not necessary to machine the ends of the spools, as the rubber equalizes the pressure against the disks. Inasmuch as the entire assembly is secured together by the gang bolt, the resiliency provided by the spacing washers keeps the gang bolt nuts tight, thereby preventing the assembly from loosening and causing wobbling of the disks.

The use of resilient mountings offer the further possibility of the use of lighter and less expensive spool castings and bearing standards, thereby further reducing the cost of the implement. The principles of this invention are especially applicable to tilling implements such as disk tillers, harrows and the like.

In the preferred embodiment of my invention, the discs are mounted directly in contact with the gang bolt, the resilient means being in the form of washers between the faces of the disks and spacing spools, thus providing for a slight axial or tilting movement of the disks but practically no yielding in the plane of the disk. Another embodiment employs a spring metal washer for the same purpose. Still another embodiment uses a metal casting backed by a coil spring. In a further embodiment, it is an object of my invention to provide for some resiliency between the disks and the gang bolt, whereby the disks can yield slightly in the planes of the disks, normally substantially perpendicular to the gang bolt.

Other objects and advantages will be apparent after a consideration of the following description of several embodiments of my invention, reference being had to the drawings appended hereto, in which Figure 1 is a fragmentary sectional elevation of a disk gang of an implement embodying the principles of my invention;

Figure 2 is a detailed section of one disk, showing an embodiment in which the disk is mounted in contact with the gang bolt, with resilient washers between the faces of the disks and the spacing spools;

Figure 3 is a detailed sectional view of a single disk showing an embodiment in which additional resiliency is provided between the disk and the gang bolt;

Figure 4 is a similar view showing an embodiment employing a casting backed by a coil spring;

Figure 5 is a similar view showing an embodiment employing spring metal washers; and Figure 6 is a side view of one of the washers shown in Figure 5.

Figure 1:
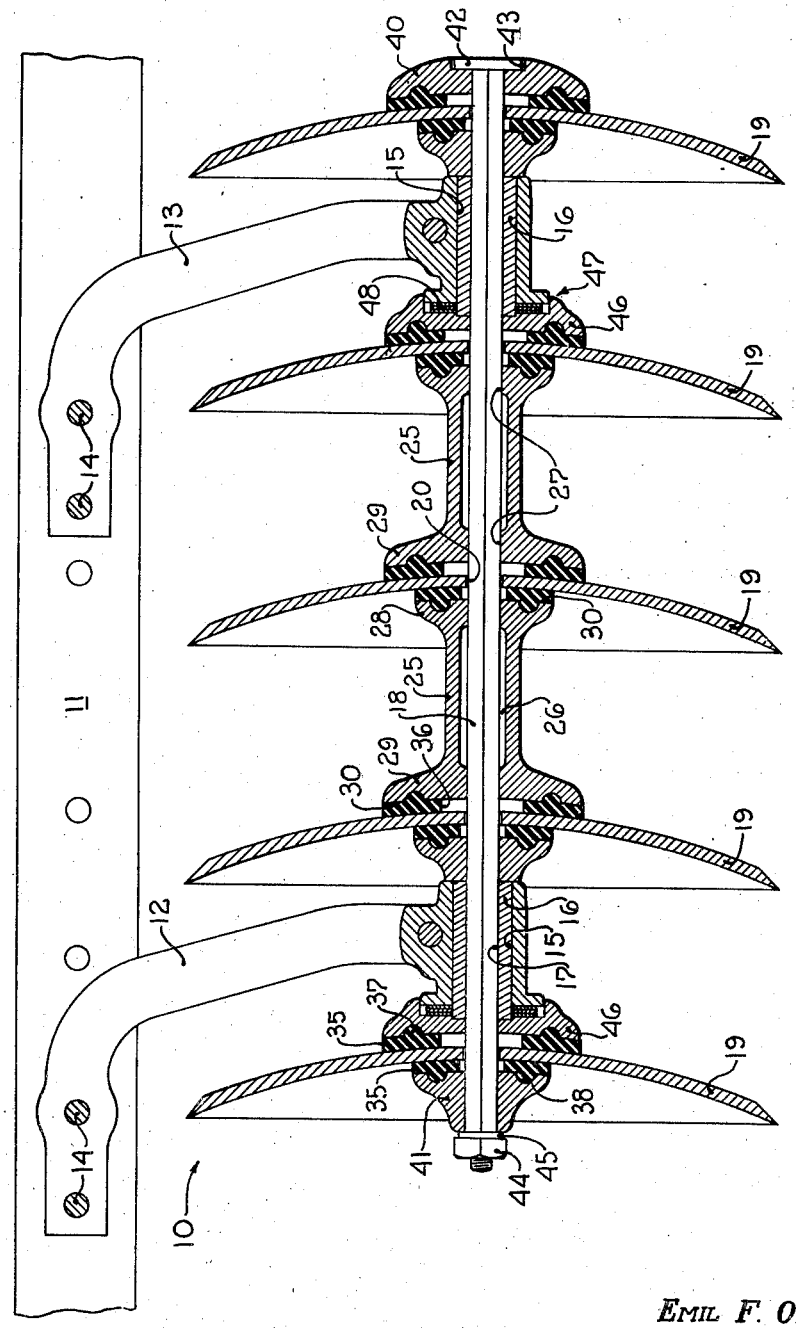

Referring now to the drawings and more particularly to Figures 1 and 2, the disk gang, indicated in its entirety by the reference numeral 10, comprises a gang frame 11 of more or less conventional design, to which are fixed a pair of supporting standards 12, 13 by means of bolts 14. The lower ends of the standards carry bearings 15 in which are journaled cylindrical bearing sleeves 16, the latter having apertures 17 of square cross section to receive the square gang bolt 18. Disposed on the bolt 18 are concavo-convex ground working discs 19, each of which is provided with a square opening 20 adapted to receive the bolt 18. The opening 20 is made slightly larger than the bolt in order to permit axial sliding movement of the disc on the bolt and also a limited angular tilting movement relative thereto, but fits closely enough to prevent rotation of the disk relative to the bolt. The aperture 20 is usually disposed on the central axis of the disk 19, but in cases of basin forming implements, the aperture may be eccentrically disposed, as is conventional in such implements.

Between each pair of adjacent disks is disposed a spacing spool 25, preferably of cast metal with a cored interior space 26, at each end of which is formed a supporting portion 27 of square cross section adapted to slide over the bolt 18 and to prevent rotation of the spool relative to the bolt 18.

Each end of each spool 25 is flared radially outwardly as at 28, 29, to provide faces 30, which bear against opposite sides of the disks, respectively. The faces 30 are preferably curved to correspond to the concave and convex curvatures of the surfaces of the discs. The ends of the spools adjacent the convex sides of the disks have flared portions 29 of larger diameter than the opposite ends to better distribute the thrust received from the disks, as is conventional in the art.

A resilient spacing member is disposed between each end face of each spool 25 and the surface of the adjoining disk 19. In the embodiment of Figures 1 and 2, this member is in the form of a rubber washer 35 having an enlarged central aperture 36 to receive the gang bolt. The washer is made of rubber that is firm, but not hard, and is formed with a bead or ridge 37 on one side thereof. The ridge engages an annular groove 38 in the face 30 of the spool for the purpose of centering the washer 35.

At opposite ends of the gang bolt 18 are end caps 40, 41, which bear against the outer sides of the end disks, with rubber washers 35 therebetween. One end of the bolt 18 is formed with a head 42 which seats in a recess 43 in the end cap 40, while the opposite end of the bolt is turned round and threaded to receive a clamping nut 44 and washer 45, by means of which the disks, spools, and rubber washers are clamped tightly together. The spools 25 and end caps 40 and 41 serve as members clamping the disks in spaced apart relation with the rubber washers 35 held firmly against opposite sides of each disk.

The bearings 15 take the places of two of the spools, and have thrust caps 46, bearing against the convex side of the adjacent disk through rubber washers 35. The thrust caps 46 are adapted to rotate with the gang bolt 18, and the thrust of the disks is taken against the standards 12, 13 through thrust bearings 47, including a number of metal washers or shims 48 used for obtaining the proper amount of end play between the standards and the gang bolt in more or less conventional manner.

The embodiment of Figure 3 is similar to that shown in Figure 2 except that the disk 19′ is flared at the aperture 50 to provide a laterally directed section or supporting flange 51 which extends into a recessed part of the spool 25 employed in this modification. A bushing 52 made of firm rubber or other suitable resilient material has a square opening 53, which embraces the bolt 18 and is non-rotatable thereon. The bushing 52 has an axially extending disk supporting portion 54 which fits tightly within the flange 51 of the disk and upon which the latter bears, and an outwardly flared portion 55 lying between the face 30 of the spool 25 and the convex side of the disk. A rubber washer 56 is provided between the opposite spool and the concave side of the disk. In operation, the disk 19′ is permitted a small amount of movement in a radial plane as well as the angular tilting movement of the embodiment of Figure 2. The aperture 50 in the disc 19′ can be made circular as this is more easily formed in manufacture, but may be made square or otherwise non-circular, if desired.

In the embodiment of Figure 4, the rubber washers are omitted and a spacing cap or bushing 60 is provided instead, consisting of a sleeve portion 61 disposed on the bolt and non-rotatable thereon, and having an end portion 62 of reduced width, and of preferably square cross section, on which slides a cap 63 having an interior recess 64, within which is disposed a coil spring 65 encircling the end portion 62. The spring 65 bears against the cap 63 and reacts against a shoulder 66 on the sleeve portion 61. The spring backed cap or bushing 60 permits a limited axial movement of the disk, and is normally under an initial compression set up by tightening the nut 44 on the gang bolt 18.

In the embodiments of Figures 5 and 6, the rubber washers are replaced by spring steel washers 70 on either side of the disk 19. The washers are cupped and have a plurality of radially extending slots 71, defining a number of spring fingers 72 which bear upon the disk 19 at their outer end. A centrally disposed aperture 73 embraces the bolt 18 and the pressure of the spring washers reacts against the ends of the spools 25. The spring washers 70 act similarly to the rubber washers 35 to provide a limited flexibility in the disk mounting.

Although the foregoing description stresses the use of rubber as the material from which the washers are made, I do not intend my invention to be limited to this particular material, for various other shock absorbing or vibration damping materials are known to those skilled in the art.

Furthermore, although material of a resilient nature is preferable, beneficial results to a certain extent could be obtained by washers made of materials which are not resilient, but are relatively pliable or deformable as, for instance, fiber or lead, for I have found that the disk mounting requires very little yielding properties to produce a noticeable shock absorbing effect.

I claim:

1. A disk gang comprising a gang bolt of non-circular cross section, a plurality of concavo-convex working disks mounted in spaced relation thereon, spacing spool members mounted on said bolt between said disks, cap members disposed on said gang bolt at the outer ends thereof on the outside of the outer disks, each of said members having radially outwardly extending flanged sections, each disk having a non-circular opening relatively closely fitting said gang bolt and through which the gang bolt passes, whereby each disc is supported in substantial metal-to-metal contact and held against rotation relative to said gang bolt, each of said disks being capable of limited lateral rocking movement about its point of non-rotatable support on the gang bolt, and a pair of yielding members, each having a central opening with an internal diameter greater than the gang bolt, said yielding members being disposed on opposite sides of each disk between the latter and the adjacent flanged sections, whereby said yielding members are normally out of contact with the gang bolt and lateral rocking movements of each disk about its metal-to-metal contact with said gang bolt are cushioned while all of said disks are caused by said contact with the gang bolt to rotate together, said yieldable members engaging each disk on opposite sides thereof and radially outwardly of the central supported portion of the disk, whereby laterally directed shocks, vibrations and the like, to which the disks are subjected in operation, are cushioned and absorbed.

2. A disk gang comprising a gang bolt, a plurality of concavo-convex working disks mounted in spaced relation thereon, spacing spool members mounted on said bolt between said disks, cap members disposed on said gang bolt at the outer ends thereof on the outside of the outer disks, each of said members having radially outwardly disposed flanged sections, means whereby the central portion of each disk is supported on said gang bolt for limited lateral rocking movement thereon in both directions, and a plurality of pairs of generally flat yieldable non-metallic rings disposed on opposite sides of each disk between the latter and the adjacent flanged sections, each of said flanged sections having an annular groove formed therein and each of said yieldable rings having an annular rib formed on the side thereof received by the associated grooved section, whereby the ribs and grooves determine the positions of the rings, the latter being out of contact with the gang bolt.

3. A disk gang comprising a gang bolt, a plurality of concavo-convex working disks mounted in spaced relation thereon, spacing spool members mounted on said bolt between said disks, cap members disposed on said gang bolt at the outer ends thereof on the outside of the outer disks, each of said members having radially outwardly disposed flanged sections, supporting means for the central part of each disk comprising a supporting surface which is formed by aperturing each disk and turning the edge of the aperture generally laterally, a pair of generally flat yieldable non-metallic rings disposed on opposite sides of each disk between the latter and the adjacent flanged sections, and shock absorbing means disposed between the gang bolt and each of the laterally turned sections of the disks.

4. In a ground working tool, a supporting bolt, a disk having an aperture through which said bolt extends, and a laterally directed section surrounding said aperture to provide a supporting surface spaced from said bolt, a pair of rigid clamping members mounted on said bolt on opposite sides of said disk, a deformable shock absorbing member having a supporting portion closely embracing said bolt, on which the supporting surface of said disk bears, and an outwardly extending flange portion lying between one side of said disk and one of said spools, the other clamping member being recessed to receive said laterally directed section, and a second deformable shock absorbing member disposed between said other clamping member and the other side of said disk.

5. A disk gang comprising a frame, a gang bolt of square cross section supported thereon and rotatable relative thereto, a plurality of ground working disks mounted on said bolt, said disks having square apertures through which said bolt extends and slidable but non-rotatable relative thereto, spacing spools on said bolt between said disks and having square apertures for preventing rotation of said spools relative to said disks, spring metal washers encircling said bolt between each spool and its adjacent disk, said washers engaging the disks radially outwardly of their support on the bolt and providing for a limited amount of axial movement of each disk relative to its adjacent spools, and a nut on said gang bolt for securing the assembly together.

6. In a ground working implement, an axle bolt, a disk tool having an aperture through which said bolt extends, clamping means mounted on said bolt on either side of said disk, and a cupped, spring metal washer disposed between said disk and each of said clamping means, each washer having a central aperture through which said bolt extends and a plurality of generally radially extending slots to provide for compression of the washer between said disk and said clamping means.

7. A disk gang comprising a gang bolt, a plurality of concavo-convex working disks mounted in spaced relation thereon, spacing spool members mounted on said bolt between said disks, each of said members having radially outward extending flanged sections, each disk having an opening through which the gang bolt passes, whereby each disk is supported on said gang bolt, each of said disks being capable of limited lateral rocking movement about its point of support on the gang bolt, and a plurality of yielding members, each having a central opening to receive the gang bolt, said yielding members being disposed between the disks and the adjacent flanged sections, whereby lateral rocking movement of each disk about its support on said gang bolt is accommodated, said yieldable members engaging each disk radially outwardly of the central supported portion of the disk, whereby laterally directed shocks, vibrations and the like, to which the disks are subjected in operation, are cushioned and absorbed.

8. A disk gang comprising a gang bolt of non-circular cross section, a plurality of concavo-convex working disks mounted in spaced relation thereon, spacing spool members mounted on said bolt between said disks, cap members disposed on said gang bolt at the outer ends thereof on the outside of the outer disks, each of said members having radially outward extending flanged sections, each disk having a non-circular opening relatively closely fitting said gang bolt and through which the gang bolt passes, whereby each disk is supported in substantial metal-to-metal contact and held against rotation relative to said gang bolt, each of said disks being capable of limited lateral rocking movement about its point of non-rotatable support on the gang bolt, and a pair of yielding members, said yielding members being disposed on opposite sides of each disk between the latter and the adjacent flanged sections, whereby lateral rocking movements of each disk about its metal-to-metal contact with said gang bolt are cushioned while all of said disks are caused by said contact with the gang bolt to rotate together, said yieldable members engaging each disk on opposite sides thereof and radially outwardly of the central supported portion of the disk, whereby laterally directed shocks, vibrations and the like, to which the disks are subjected in operation, are cushioned and absorbed.

EMIL F. OHLENDORF.